United States Patent [19]
Tuli

[11] Patent Number: 5,942,761
[45] Date of Patent: Aug. 24, 1999

[54] ENHANCEMENT METHODS AND DEVICES FOR READING A FINGERPRINT IMAGE

[76] Inventor: Raja Singh Tuli, 55 City Centre Dr., Suite 500, Mississauga, Ontario, Canada, L5B1M3

[21] Appl. No.: 08/478,792

[22] Filed: Jun. 7, 1995

[51] Int. Cl.[6] .................................................. G06K 5/00
[52] U.S. Cl. ............................................ 250/556; 356/71
[58] Field of Search ................................. 250/556, 557; 356/71, 73.1; 382/415, 8

[56] References Cited

U.S. PATENT DOCUMENTS

| | | | |
|---|---|---|---|
| 4,544,267 | 10/1985 | Schiller | 356/71 |
| 5,446,290 | 8/1995 | Fujieda et al. | 356/71 |
| 5,448,649 | 9/1995 | Chen et al. | 356/71 |

*Primary Examiner*—Que T. Le

[57] ABSTRACT

A fingerprint reading modular device capable of extracting and accurately reproducing and enhancing the ridge pattern on the skin of a fingertip is provided. A narrow illumination source spanning the width of the device is focused onto a movable glass or transparent platen, producing reflected rays containing fingerprint information, as the finger is placed on this platen. Reflected rays are focused by a Selfoc optic fiber lens array onto a linear array of solid state reading elements which convert the image of the fingerprint to electrical signals, producing a digital image for each line of information. The movable transparent platen has an initial position and a terminal position, such that the method of scanning begins with the finger pressed against the platen in its initial position and pushed until the platen reaches its terminal position, whereby the solid state elements read multiple lines of the finger as it moves towards the terminal position.

3 Claims, 8 Drawing Sheets

ENHANCEMENT METHODS AND DEVICES FOR READING A FINGERPRINT IMAGE

BACKGROUND OF THE INVENTION

The present invention relates to an apparatus and a method for producing a fingerprint ridge extraction system to accurately enhance and reproduce fingerprint images. The heart of the invention lies in the implementation of a reading technique utilizing a contact image sensor array, with many image enhancement methods to better define ridge patterns on the skin of a fingertip. The functionality of the device is quite unique, as it involves the user's finger to slide a movable glass or transparent platen past the reading elements on the sensor array mounted to the housing, automatically applying a constant pressure on the platen for proper imaging. This provides a positive action whereby the user knows and determines when the scanning cycle commenced and when it was completed.

The main application for the present invention and related prior art is in identification purposes, as fingerprints in human beings remain consistent throughout life and no two are alike. One major application of the device is to be used in conjunction with pattern recognition software means, to identify similarities between fingerprints being scanned and those already scanned and stored on computer systems. Fingerprinting is an established and reliable method of personal identification, and is useful as the basis for a computer controlled security access system. Because fingerprints are generally noisy, due to imperfect inking, smudging etc., it is usually impossible to clean up such images using any thresholding methods. The present device selects features of interest such as the ridge orientations, enabling suppression or elimination of this noise.

Prior art in this field would involve fingerprint reading devices whereby the user places a finger on a fixed glass platen, below which a lens system focuses the illuminated ridge pattern onto a two dimensional area CCD (Charged Coupled Device) chip. Image enhancement means presently used in the art employ prisms or glass surfaces to reveal better ridge patterns. Most fingerprint sensor devices use the prism method whereby a light beam is introduced into a prism from one of its slanted surfaces. This beam is positioned to meet the conditions of total internal reflection at the top surface of the prism. When a finger is placed on top of this surface, the conditions of total internal reflection are no longer met at points of contact with the ridge pattern. Consequently light incident at these points would not be reflected and an image is created of the fingerprint. The image then passes out of the prism at the other slanted surface and is brought into focus on the image pickup element (CCD) with the aid of a lens system. An inherent problem producing a major disadvantage of this prism method is trapezoidal distortion created by unequal optical paths between each point of the fingerprint and the image focusing lens. Other prior art systems which eliminate trapezoidal distortion tend to be quite complicated and expensive in construction. Holographic fingerprint sensors use a laser beam as its light source and consist of a light conducting plate, which is a transparent glass plate with a plain grating type hologram, and a focusing system just under the hologram. Since the sensor uses a planar parallel plate, all the optical paths from each point of a fingerprint to the hologram are equal, creating a defined fingerprint without trapezoidal distortion. These devices do not provide a positive action as the user has no idea at what stage the scanning cycle is at any time.

The main problem associated with most prior art systems for this particular application is the high cost of the lens and CCD chip assembly. Area type CCD's are less reliable than linear CCD's or contact image sensors, and are considerably more expensive. Devices that utilize CCD technology tend to consume a much larger space than contact image sensors, due to the greater focusing distance between the image plane and the CCD.

SUMMARY OF THE INVENTION

In a principle aspect of the present invention, a fingerprint reading modular device capable of extracting and accurately reproducing the ridge pattern on the skin of a fingertip with the aid of enhancement techniques, is provided.

In a further aspect of the present invention, the reading device is constructed of an illumination source focused by a lens system onto a glass or transparent platen. Reflected rays containing fingerprint information are focused by a Selfoc optic fiber lens array onto a linear array of optical sensors, comprising solid state devices which convert the image of the fingerprint to electrical signals, producing a digital image for each line of information. The illumination source is a narrow focused beam spanning the full width of the solid state devices, which reads one line of a fingerprint at a time as the fingertip moves past the reading elements on a movable platen.

In a further aspect of the present invention, the fingertip to be read is placed on a movable glass or transparent platen and applies adequate constant pressure to provide a clear image of the fingertip's ridge pattern, and also slide the platen forward without the fingertip sliding on the platen, past the linear array of reading elements. The static friction of the fingertip against the glass or transparent platen is greater than the kinetic friction of the platen against its housing elements. Hence, the finger does not slip against the platen as it provides a sufficient normal force against it in sliding the platen.

In a further aspect of the present invention, the glass or transparent platen has a patterned strip affixed which is scanned simultaneously with the fingertip, such that it signals the device's microprocessor when each "scan line" is read, as the reading elements can read each scan line many times. Hence, reading can be performed at a variety of speeds limited only by the time it takes to read each line and process this information, which can be stored in a buffer. The thickness of each line that is read and the space between each picture element or pixel on the linear array of reading elements, ultimately determines the resolution of the image.

In a further aspect of the present invention, light from a source spanning the full width of the optical sensor array, is focused and aimed at the glass or transparent platen at an angle of incidence above its critical angle, such that if the finger were not there almost all the light would be reflected back to the sensor array. The ridge pattern against the glass or transparent platen on the opposite side of the light source absorbs some light where it contacts the platen, whereas the valleys between ridges are not in contact with the platen and allow almost all light to be reflected back to an optical sensor array, focused by a Selfoc optic fiber lens array. Light absorbed by the ridge pattern produces a lower intensity reflection which is interpreted as the ridge pattern for each line read. In another embodiment of the invention, a linear CCD is used instead of the contact image sensor array, as area type CCD's being unsuitable are susceptible to interference by reflected and refracted light rays from various surfaces.

In a further aspect of the present invention, light from a source spanning the full width of the optical sensor array, is focused and aimed through the glass or transparent platen at one end such that light does not leave the platen at any point. All the light is contained within the platen as all rays are above the critical angle and the platen acts as a wave guide for this light within. Points of contact between the ridge pattern and the platen reflect light in many directions other than the critical angle through the platen, and the image of the ridge pattern which becomes visible can be focused and read by the device. This provides another embodiment of the device for imaging and enhancing the fingerprint's ridge pattern.

In a further aspect of the present invention, the glass or transparent platen has a very fine uniform opaque grid pattern deposited and etched which act as a two dimensional pin hole lens array. When a fingertip is placed on this grid pattern with a light source focused on this grid, light is reflected off the ridges covering the pin holes on the platen back to an image sensor array, whereas the valleys between ridges permit light to pass through these pin holes absorbing it. Ridges close to the pin holes and directly above are in focus, but valleys away from the pin holes are not in focus or appear dark and are not detected by the optical sensor array. This provides another embodiment of the device for imaging and enhancing the fingerprint's ridge pattern.

In a further aspect of the present invention, the light source emits a narrow focused beam onto the ridge pattern at an angle, producing a shadow effect throughout valleys between ridges. The linear array of optical sensors interprets those areas with a low intensity of reflected light as valleys in the fingerprint being read. Such a method can't be used in prior art devices which illuminate the entire print area leaving no shadows. This provides another embodiment of the device for imaging the fingerprint's ridge pattern.

In a further aspect of the present invention, a layer of pressure sensitive liquid crystals is deposited over the glass or transparent platen. Ridges that come in contact with the coated platen produce a color change as the finger applies pressure on the surface. The color change enhances the ridge pattern on the fingertip and provides another embodiment of the device for imaging the fingerprint's ridge pattern.

In a further aspect of the present invention, a layer of heat sensitive liquid crystals is deposited over the glass or transparent platen. A metal layer is deposited over the liquid crystal layer and etched out to a matrix grid pattern, forming very small individual metal pads. As the ridge pattern conducts body heat to the metal pads, these metal pads heat up and conduct heat to the liquid crystals beneath which change color to provide an enhanced ridge pattern. Valleys between ridges are not in contact with metal pads so the areas directly beneath these valleys do not induce a color change in the liquid crystals. This provides another embodiment of the device for imaging and enhancing the fingerprint's ridge pattern.

In a further aspect of the present invention, a transparent heat conductive layer is deposited over the glass or transparent platen and etched out to a matrix grid pattern, forming very small individual pads on the platen. A thermochromic liquid crystal layer is deposited over this array of pads in a uniform layer. As the ridge pattern conducts body heat to thermochromic liquid crystals, this heat is transferred to the conductive pads which heat up and retain this heat for the entire duration to transform the liquid crystals directly above to another color to provide an enhanced ridge pattern. Valleys between ridges are not in contact with thermochromic liquid crystals so the areas directly beneath these valleys do not induce a color change in the liquid crystals. This provides another embodiment of the device for imaging and enhancing the fingerprint's ridge pattern.

In a further aspect of the present invention, the fingerprint reading mechanism is arranged to operate by the user applying a vertical force on the glass or transparent platen, by pressing on it with the finger to be read. The illumination source, solid state devices, and focusing means are all mounted within an internal housing. An external housing contains the internal housing linked to a glass or transparent platen, and by moving the platen down or up, the internal housing moves across the platen always at a constant distance from the platen. The finger presses on the platen and reading commences when the platen moves from its rest position, until a terminal position is reached. No friction forces occur between the platen and the finger for this embodiment, eliminating the chances of any slippage.

BRIEF DESCRIPTION OF DRAWINGS

This invention maybe better understood and its numerous objects and advantages will become apparent to those skilled in the art by reference to the accompanying drawings as follows.

DETAILED DESCRIPTION OF PREFERRED EMBODIMENTS

Figure 1:
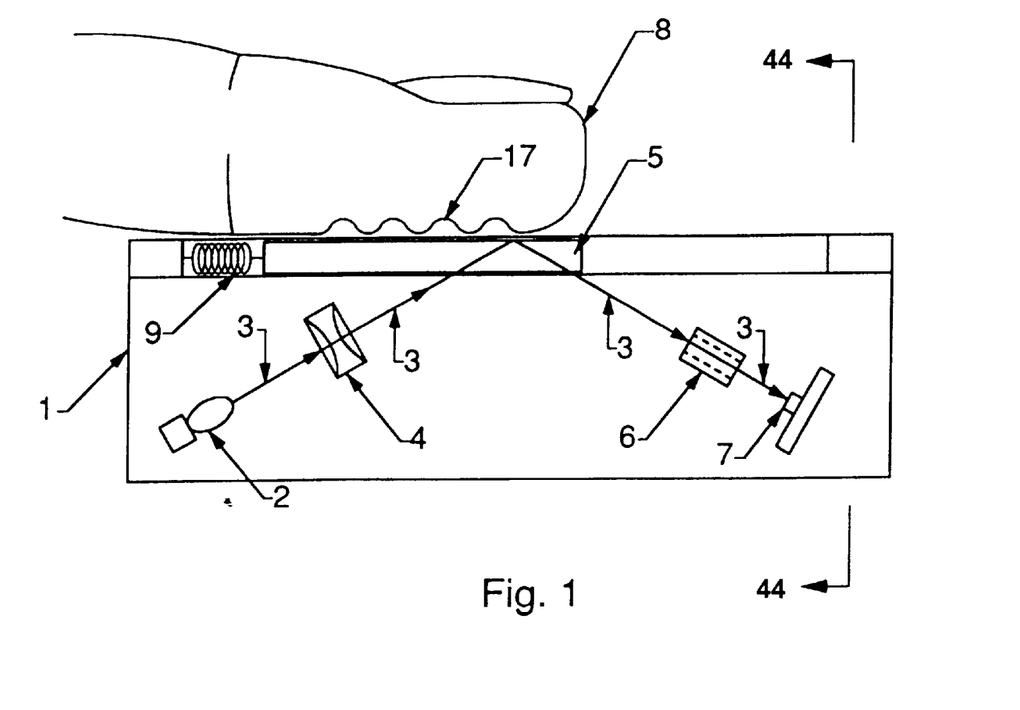
FIG. 1 illustrates the fingerprint reading device at commencing position in accordance with the present invention.

For a better understanding of the invention, reference is first made to FIG. 1 which represents the layout of major components within the device. The housing 1 contains an illumination source 2 which sends rays of light 3 firstly through a lens system 4, which focuses the light into a narrow beam onto a movable glass or transparent platen 5. The illumination source spans the full width of the maximum reading capacity of the device. All light incident to the glass or transparent platen is above its critical angle, such that almost all light is reflected back into a Selfoc optic fiber lens array 6, which focuses the reflected light onto an optical sensor array 7. The illumination source is positioned such that the conditions of total internal reflection are satisfied. The optical sensor array consists of one or more solid state devices with many individual photo cells in a linear array, which convert the image focused on them to electrical signals, producing a digital image which can be further processed to obtain a true representation of this image in a tangible form, or stored on a computer system for future reference. The device is capable of reading one line of information at a time restricted by the size, spacing and width spanned by the individual photo cells in the linear array. Each line of information is read many times but sent only once to a microprocessor which assembles the image received in lines, and also performs image enhancement techniques to produce a true representation of the fingerprint being scanned. The finger 8 with its ridge pattern 17 against the glass or transparent platen 5 alters the incident light to produce reflected rays containing information on the ridge pattern. A spring system 9 fastened to the housing 1 and the glass or transparent platen 5, is used to return the platen to its rest position as illustrated in FIG. 1, as the platen slides along the housing in a horizontal plane and also keeps it there in a ready position to commence reading another fingerprint. The process of scanning a fingerprint begins with the glass or transparent platen of the device in a starting position as illustrated in FIG. 1, and ends with the platen in the terminating position of FIG. 2, whereby the solid state elements read multiple lines of the finger as it moves towards the terminating position. The rate at which information is read is much faster than the rate at which the fingerprint advances past the reading elements. The linear array of reading elements are individually positioned equidistant from the glass or transparent platen such that their direction of arrangement is perpendicular to the platen's direction of movement. Upon removing the finger from the glass or transparent platen in the position of FIG. 2, or at any intermediate location between starting and terminating positions, the platen returns to the rest position of FIG. 1 due to the force applied by the spring system 9.

Figure 2:
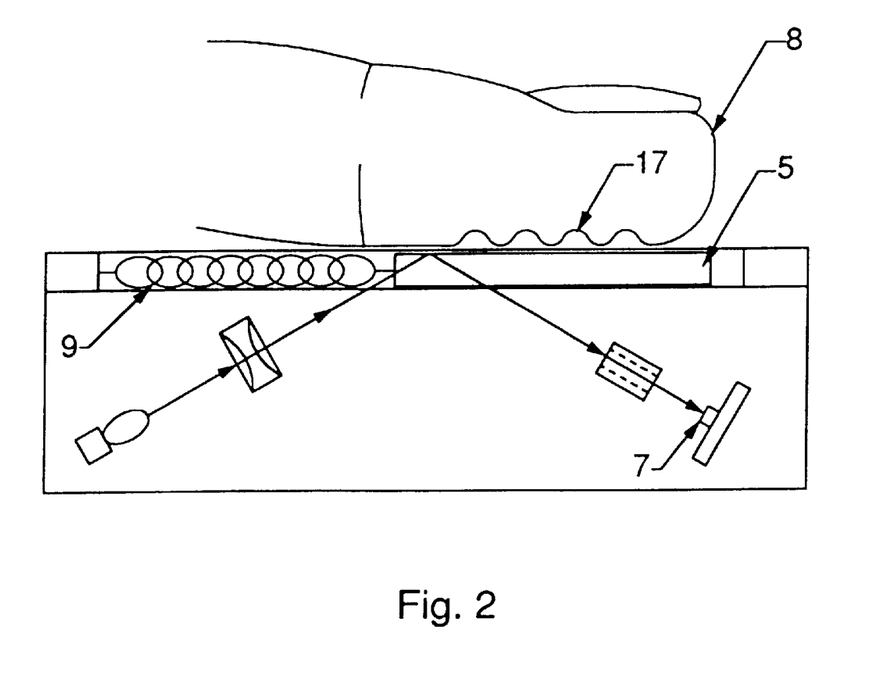
FIG. 2 illustrates the fingerprint reading device at completion position in accordance with the present invention.

Referring now to FIG. 2, which represents the glass or transparent platen 5 in its forward or terminating position at the end of scanning a fingerprint. The finger 8 has to apply a normal force on the glass or transparent platen 5 such that the ridge pattern 17 on the fingertip provides a well defined flattened image to be read by the optical sensor array 7. The force applied by the finger on the platen is sufficient to produce a static friction between the finger and the platen that is greater than the kinetic friction generated between the platen and the housing components in contact, in addition to the force exerted by the spring system 9, such that the finger does not slip against the platen as it applies a force to slide the platen between starting and terminating positions. The spring system 9 is always extended to apply a force to pull the platen towards the rest position, and also applies a force to keep the platen in the rest position when not in use. The reading sequence commences as the platen is moved from its rest position by the finger. The entire fingerprint is divided into many lines one picture element or pixel in width, of a maximum length determined by the span of optical sensor elements in the linear array. Each line is read many times as the finger moves forward, but only one such line is extracted and sent to a buffer which stores this information for the device's microprocessor to compile. The device employs a specific means whereby it discards lines that have been already read until a new line is focused on the sensor elements, as further explained in FIG. 4. Extracted lines are complied to form the scanned image of the fingerprint.

Figure 3:
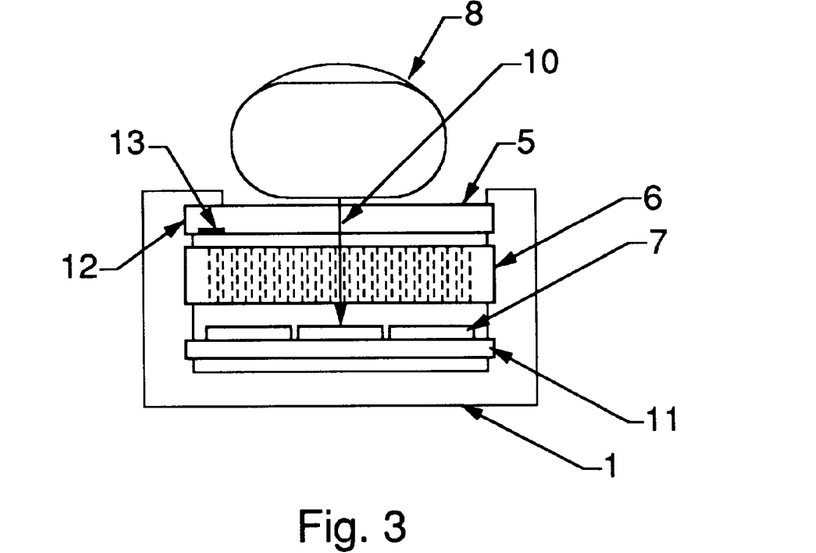
FIG. 3 is a modified sectional view A—A of FIG. 1 with the Selfoc lens array and solid state reading devices rotated in an upright position to better demonstrate the construction, in accordance with the present invention.

FIG. 3 is a modified sectional view A—A of FIG. 1, where the Selfoc lens array and solid state reading devices are rotated in an upright position to better demonstrate the construction of the device. As rays of light are directed towards the finger 8, the ridge pattern alters incident light at points where it makes contact with the platen 5, such that reflected rays 10 have varying intensities containing information corresponding to the ridge pattern. All reflected rays 10 are directed to a Selfoc optic fiber lens array 6 which focuses this light spanning the full width of the fingerprint onto solid state integrated circuit devices 7 affixed to a circuit board 11. The Selfoc array 6 and circuit board 11 are both affixed to the housing 1, such that the glass or transparent platen 5 and finger 8 move together without slippage along groves or tracks 12 embedded in the housing. The Selfoc array 6 and solid state devices 7 span the same-width which is greater than the average fingerprint or thumb print. A patterned strip 13 is affixed or deposited or chemically etched to the topside of the glass or transparent platen, such that the incident light rays directed to the platen reflect off this strip and are also focused simultaneously with the reflected rays 10, by the Selfoc array 6 onto the solid state devices 7. This patterned strip is the device's means for regulating and compensating for any speed variations in motion of the platen along the housing.

Figure 4:
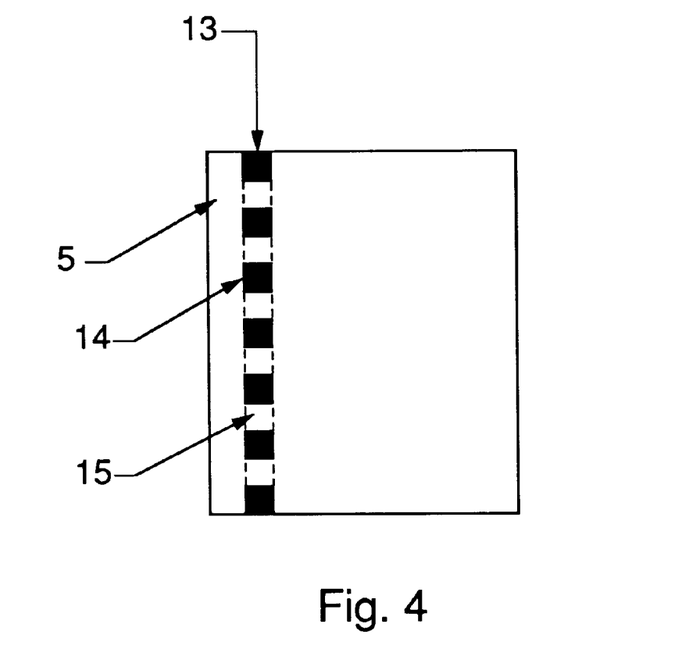
FIG. 4 illustrates the patterned strip on the glass or transparent platen, in accordance with the present invention.

In reference to FIG. 4, the glass or transparent platen 5 is shown to have a patterned strip 13 which determines the rate at which information is sent to the device's microprocessor. This strip has black or opaque elements 14 which alter the reflected light focused onto the optical sensor array. Each line of information on the fingerprint read by the sensor array is sent to the device's microprocessor at the instant a black or opaque element is simultaneously read, with each line sent only once to the microprocessor. Hence, each line of a fingerprint is aligned to a black or opaque element in the patterned strip. As the platen is advanced by the finger's applied force, a clear or white element 15 is encountered which separates the individual black or opaque elements 14. The white element 15 should ideally be as small as possible to minimize the gap between lines of information. The next line of information sent to the device's microprocessor corresponds to the following black or opaque element. Hence, the speed at which the platen moves can vary along the distance traversed with each line of information read many times, but sent only once to the device's microprocessor for compilation and assembly of the scanned image.

Figure 5:
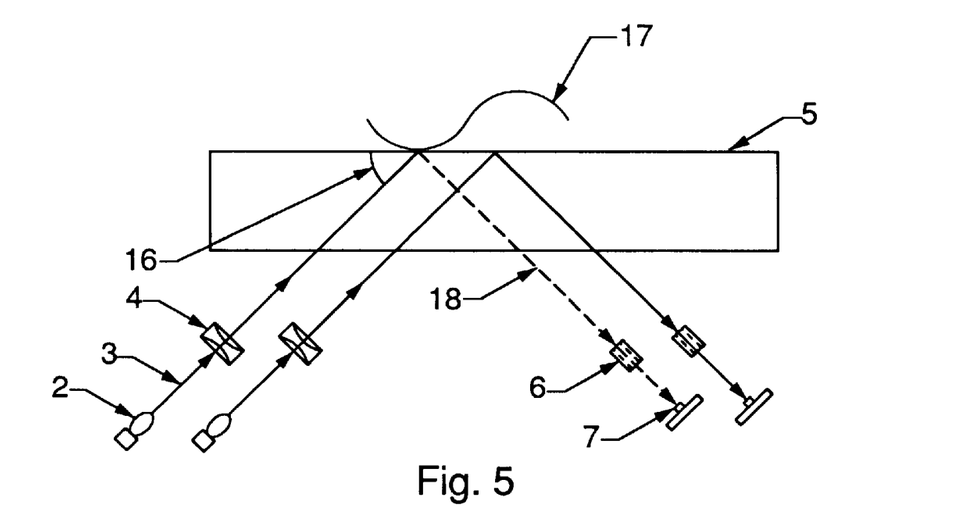
FIG. 5 illustrates a ridge absorbing light in contact with the glass or transparent platen, in accordance with one embodiment of the present invention.

A means for enhancing and reading the ridge pattern on a fingertip is illustrated in FIG. 5, whereby light rays 3 from a source 2 are focused by a lens system 4 and directed towards a glass or transparent platen 5 at an angle 16. All rays are above the critical angle such that almost all the light rays are reflected back towards the Selfoc lens array 6. The illumination source is positioned such that the conditions of total internal reflection are satisfied. When a ridge pattern 17 is placed against the glass or transparent platen, ridges in contact with the platen absorb some of the light and produce reflected rays of lower intensity. Valleys between ridges are not in contact with the platen and allow most of the light to be reflected back at almost the same intensity as the incident rays. The solid state reading elements 7 produce an electrical output in relation to the intensity of light focused on them. Hence, the low intensity areas are interpreted as ridge patterns that appear against the glass or transparent platen, whereas the high intensity areas are interpreted as the valleys between ridges. The solid state reading devices 7 can be in the form of a CCD (Charged Coupled Device) or contact image sensor integrated circuits, both capable of producing an electrical signal varying with intensity of image focused on them. CCD's generally use a camera type lens system as the focusing means.

Figure 6:
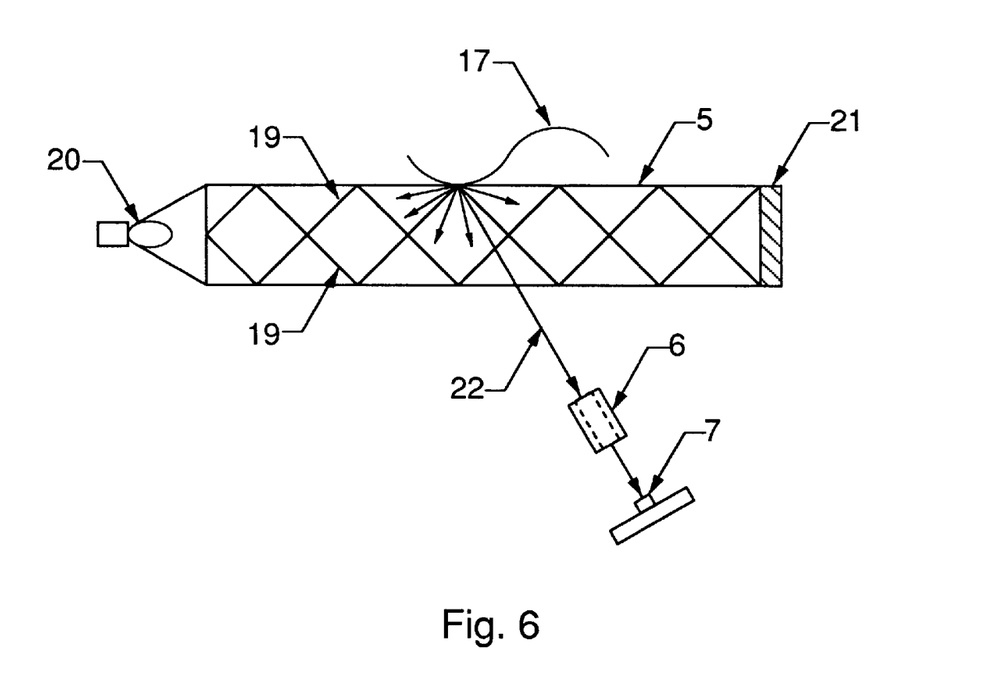
FIG. 6 illustrates a ridge reflecting light in contact with the glass or transparent platen as light is contained within the platen, in accordance with one embodiment of the present invention.

Another means for enhancing and reading the ridge pattern on a fingertip is illustrated in FIG. 6, whereby light rays 19 from a source 20 travel through the glass or transparent platen 5 such that they do not leave the platen at any point, for this particular embodiment of the invention. The light source is positioned at one end and a reflective surface 21 is located at the other end, providing a medium whereby all light contained within is above the critical angle, and the glass or transparent platen acts as a wave guide for this light. When a ridge pattern 17 is brought into contact with the glass or transparent platen 5, the ridges contact the platen at points that reflect light in many directions other than the critical angle through the platen. This beam of light is arranged so as to meet the conditions of total internal reflection at the surfaces of the platen. When a finger is placed on top this platen, the conditions of total internal reflection are no longer met at the points of contact. Consequently light incident at these points will be reflected in many directions other than the critical angle through the platen, and an image is created of the ridge orientations of the fingerprint. These reflected rays 22 can be focused by a Selfoc lens array 6 and directed to a linear array of solid state reading elements 7. Valleys between ridges do not contact the glass or transparent platen and do not alter the path that light is traversing at their locations, as they do not reflect light since no light is present to emit. The reflected rays directed towards the optical sensor array consist of varying intensities which contain information pertaining to the ridge and valley locations, for each line of information read.

Figure 7:
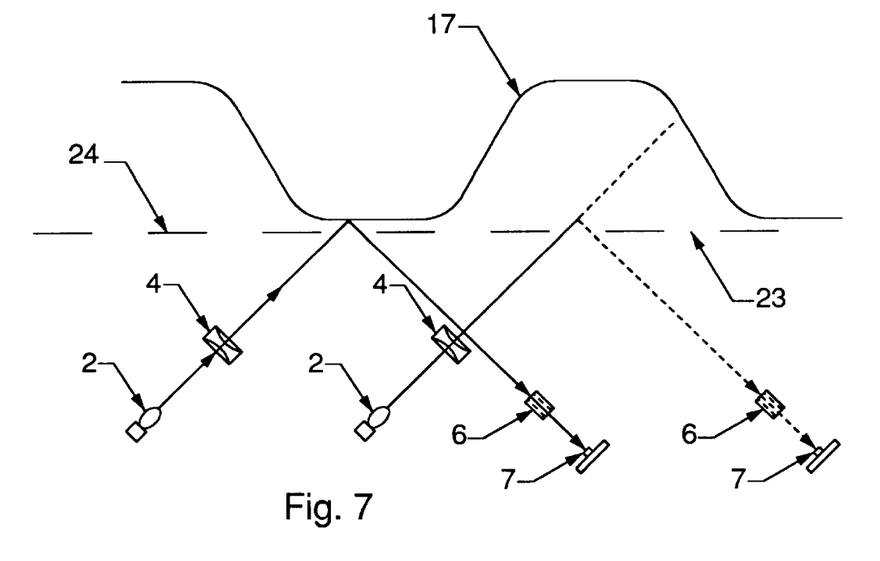
FIG. 7 illustrates a pin hole array deposited on the glass or transparent platen, in accordance with one embodiment of the present invention.

Another means for enhancing and reading the ridge pattern on a fingertip is illustrated in FIG. 7, whereby a two dimensional pin hole array is deposited and etched on the glass or transparent platen. The pin hole locations 23 allow light to pass through, whereas locations between pin holes 24 absorb any incident light. As a ridge pattern 17 is brought into contact with the glass or transparent platen, pin holes much smaller than ridges are obstructed and light from a source 2 which is focused onto the glass or transparent platen as a narrow beam by a lens system 4 is reflected off the ridges. Valleys between ridges are distanced from the pin holes and permit light to pass through which is not reflected. The ridges in contact with the pin holes 23 are in focus and light reflected off them is directed to a Selfoc lens array 6 and focused onto solid state reading devices 7. Valleys between ridges are not in focus and are not detected by the solid state reading devices. Very little light enters the pin holes in valley locations making them very dark, such that if valleys were in focus they would still appear dark. Hence, the reflected rays contain information pertaining to the ridge and valley locations by varying intensities, for each line of information read.

Figure 8:
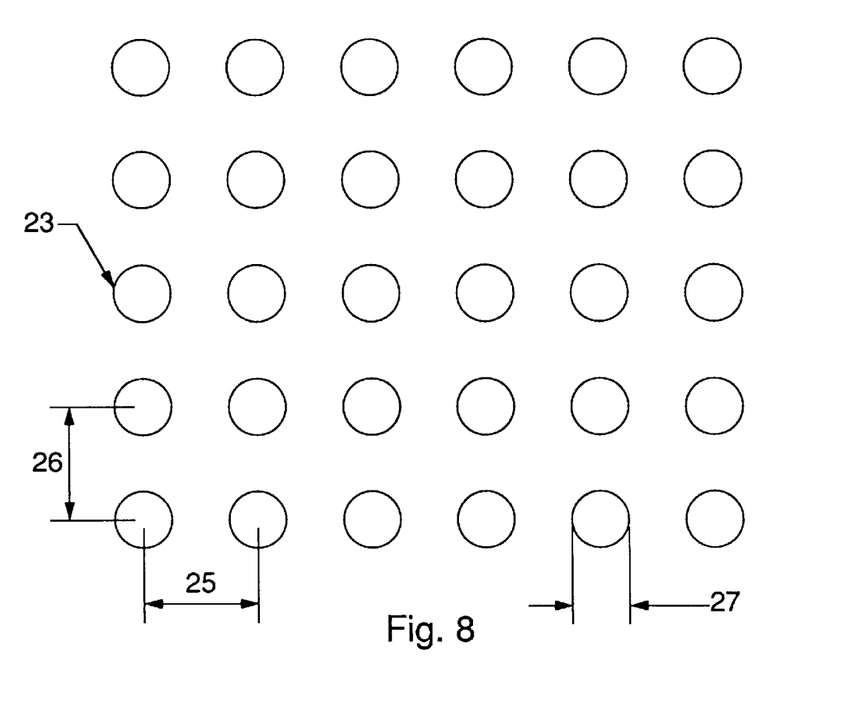
FIG. 8 is a partial illustration of the pin hole grid pattern of FIG. 7, in accordance with the present invention.

The pin hole array of FIG. 7 is further illustrated in FIG. 8 for a clearer understanding. The pin holes 23 are uniformly spaced horizontally at a distance 25 and vertically by a distance 26 of diameter 27. The pin hole spacing is much smaller than the spacing between optical sensor elements on the solid state reading devices, to produce a much higher resolution than the solid state devices. This is necessary to avoid problems commonly associated with quantization type errors. The pin holes in the array may also assume the shape of rectangles or squares.

Figure 9:
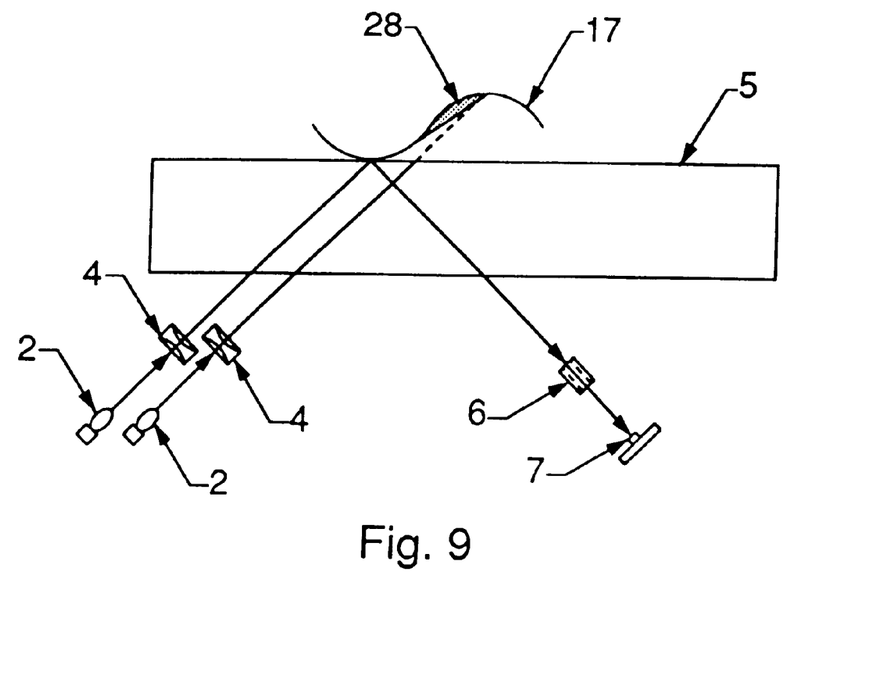
FIG. 9 illustrates a valley between ridges absorbing light producing a shadow effect, in accordance with one embodiment of the present invention.

Another means for enhancing and reading the ridge pattern on a fingertip is illustrated in FIG. 9, whereby light from a source 2 focused by a lens system 4 as a narrow focused beam, is directed onto the ridge pattern 17 of a fingerprint. With the ridge pattern against the glass or transparent platen 5 of the device, light rays focused onto ridges are reflected back to a Selfoc lens array 6 which focuses them onto the solid state reading devices 7. The illumination source is positioned such that the conditions of total internal reflection are not satisfied. The angle of incidence of this light source produces a shadow effect 28 in the valleys which are further away from the platen than the ridges. Light rays from the source are absorbed by the dark shadowed area 28 and this produces a lower intensity of reflected rays in the valley regions of a fingerprint. Hence, the reflected ray pattern off the glass or transparent platen contains varying light intensities which can be used to reconstruct the fingerprint pattern.

Figure 10:
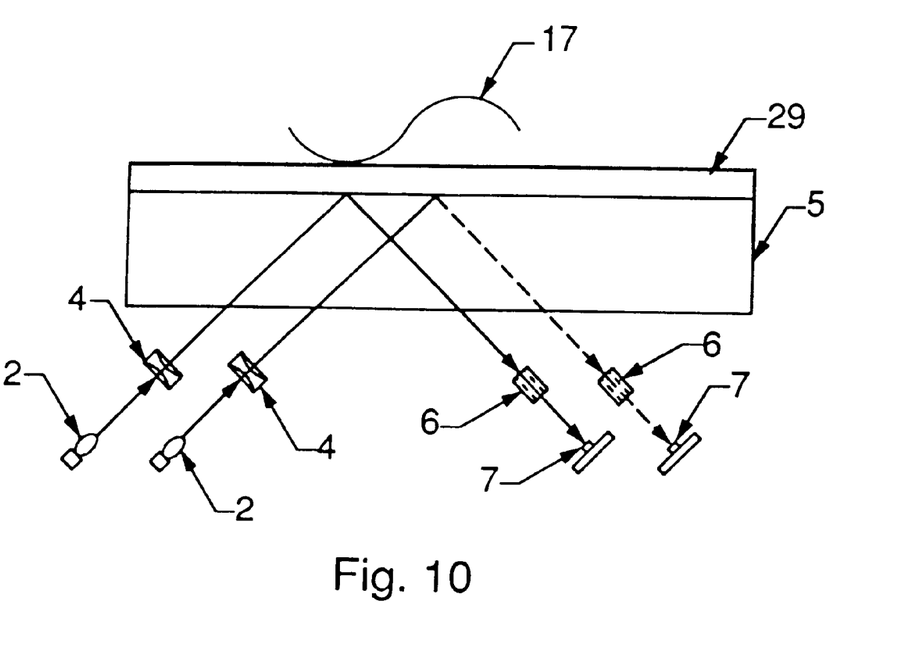
FIG. 10 illustrates a ridge applying pressure on a pressure sensitive liquid crystal layer deposited onto the glass or transparent platen, in accordance with one embodiment of the present invention.

Another means for enhancing and reading the ridge pattern on a fingertip is illustrated in FIG. 10, whereby a pressure sensitive liquid crystal layer 29 is deposited uniformly over the glass or transparent platen 5 of the device. When a ridge pattern 17 is brought into contact with the pressure sensitive liquid crystal layer, the ridges apply more pressure than the valleys sufficient to change the color of the liquid crystals, to provide a defined ridge pattern. As light from a source 2 is focused by a lens system 4 and directed to the glass or, transparent platen 5 with a ridge pattern imprinted on the pressure sensitive liquid crystal layer 29 to provide a defined color change, the reflected rays are comprised of varying intensities as some colors absorb more light directed to them than others. Rays are reflected back to a Selfoc lens array 6 which focuses them onto the solid state reading devices 7, where the ridge pattern is interpreted as one of the two intensities present in the reflected ray pattern.

Figure 11:
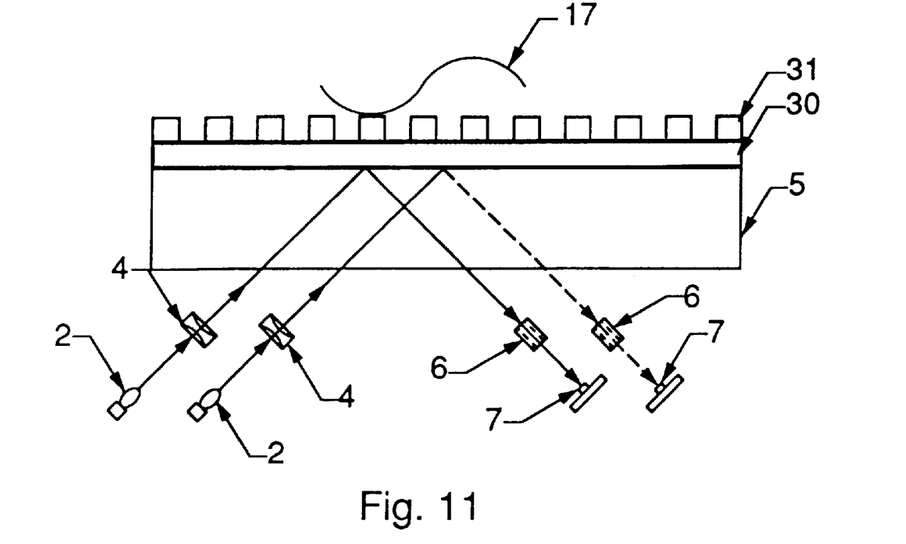
FIG. 11 illustrates a ridge applying pressure on metal pads over a thermochromic liquid crystal layer deposited onto the glass or transparent platen, in accordance with one embodiment of the present invention.

Another means for enhancing and reading the ridge pattern on a fingertip is illustrated in FIG. 11, whereby a heat sensitive or thermochromic liquid crystal layer 30 is deposited onto the glass or transparent platen 5 of the device. A metal layer is deposited over the thermochromic layer and etched into individual pads 31 arranged in a matrix formation. As a finger is brought into contact with the metal pads, the body heat conducted from the ridges 17 in contact with the pads is transferred to the thermochromic liquid crystal layer below, such that it produces a color change directly beneath pads heated by ridges. The valleys which are not in contact with the metal pads do not transfer any heat required to produce a color change in the thermochromic liquid crystal layer. Hence, heat conducted by the ridges produces a defined ridge pattern represented by a color change in the thermochromic liquid crystal layer. As light from a source 2 is focused by a lens system 4 and directed to the glass or transparent platen 5 with a ridge pattern imprinted on the thermochromic liquid crystal layer 30 to provide a defined color change, the reflected rays are comprised of varying intensities as some colors absorb more light directed to them than others. Rays are reflected back to a Selfoc lens array 6 which focuses them onto the solid state reading devices 7, where the ridge pattern is interpreted as one of the two intensities present in the reflected ray pattern.

Figure 12:
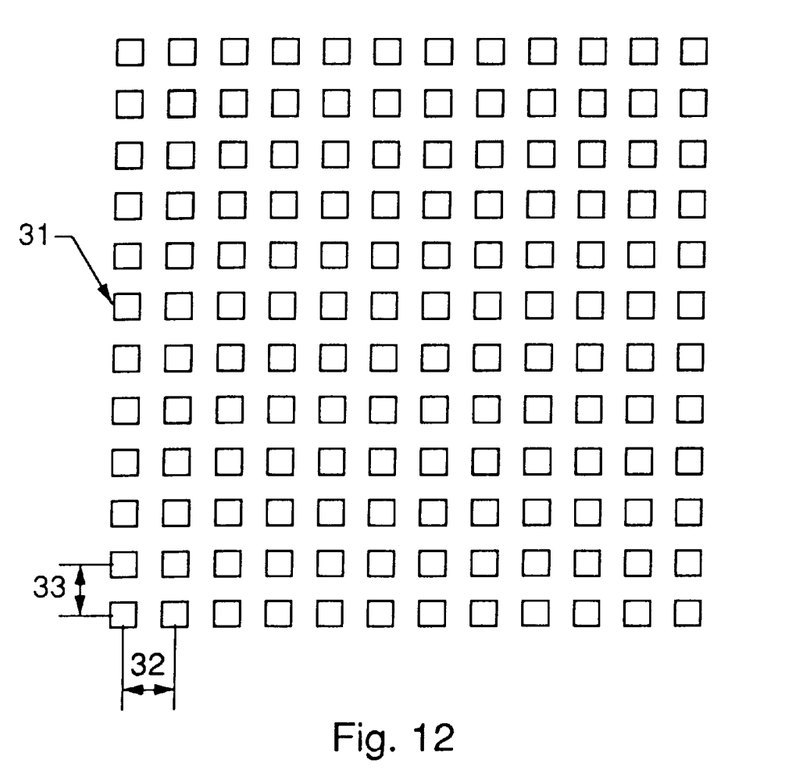
FIG. 12 is a partial illustration of the metal pad grid pattern of FIG. 11, in accordance with the present invention.

The metal pad array of FIG. 11 is further illustrated in FIG. 12 for a clearer understanding. The metal pads 31 are uniformly spaced horizontally at a distance 32 and vertically by a distance 33. The size of each pad in the array and spacing between pads in both directions is critical, as heat conducted from the ridge of a finger must not induce a color change in the thermochromic liquid crystals under adjacent pads not in contact with a ridge. Also, the thickness of the liquid crystal layer beneath the metal pads is critical to produce a substantial color change to accurately represent a defined ridge pattern placed on the pads.

Figure 13:
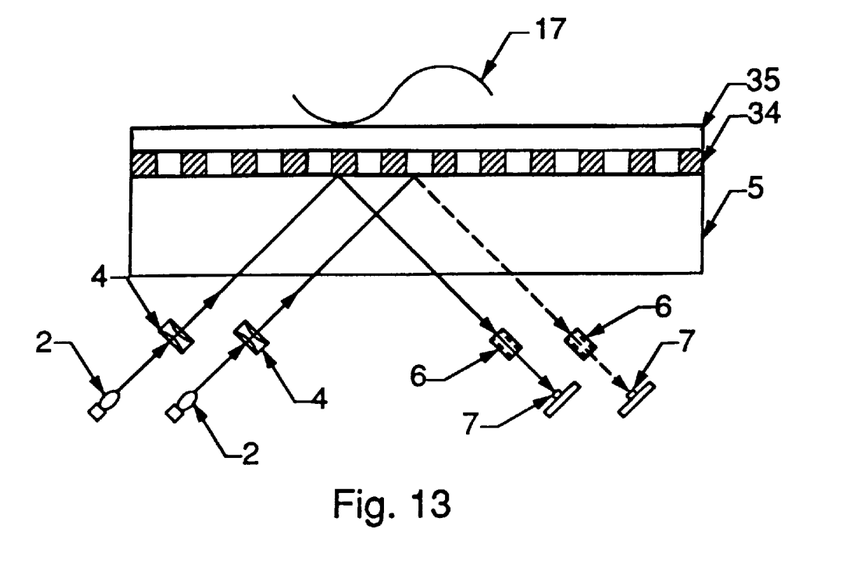
FIG. 13 illustrates a ridge applying pressure on a thermochromic liquid crystal layer deposited over heat conductive pads on the glass or transparent platen, in accordance with one embodiment of the present invention.

Another means for enhancing and reading the ridge pattern on a fingertip is illustrated in FIG. 13, whereby a transparent heat conductive layer is deposited over the glass or transparent platen and etched into individual pads 34 arranged in a matrix formation. A heat sensitive or thermochromic liquid crystal layer 35 is deposited over the heat conductive pads on the glass or transparent platen. As a finger is brought into contact with the thermochromic liquid crystal layer, the body heat conducted from the ridges 17 in contact with the thermochromic liquid crystal layer is transferred to the heat conductive layer below, such that it retains sufficient heat to produce a color change directly above. Light from a source 2 is focused by a lens system 4 and directed to the glass or transparent platen 5 with a ridge pattern imprinted on the thermochromic liquid crystal layer 35 to provide a defined color change, with the reflected rays comprised of varying intensities as some colors absorb more light directed to them than others. The ridges in contact with the thermochromic liquid crystals induce a color change to produce a defined ridge pattern, whereas the valleys do not induce a color change as they are not in contact.

Figure 14:
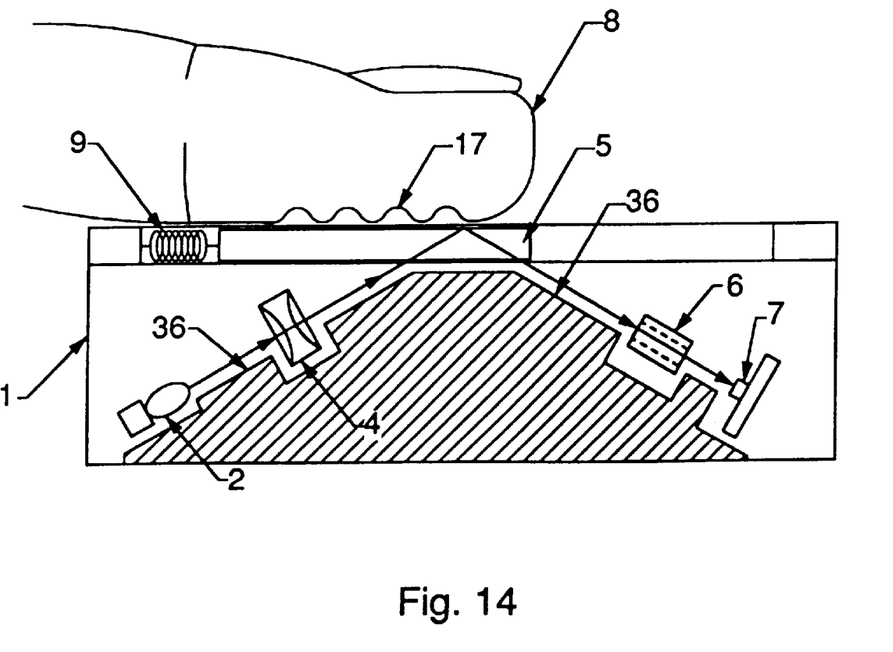
FIG. 14 is another embodiment of FIG. 1 where a barrier is incorporated to restrict interference from stray beams, in accordance with the present invention.

In a further embodiment of the invention, the apparatus of FIG. 1 is modified to incorporate a barrier between incident and reflected rays as illustrated in FIG. 14. This barrier 36 attached to the housing 1 is intended to provide an isolation means for light rays traversing the paths before and after encountering the glass or transparent platen as set forth by all embodiments of the invention. Noise can be generated by rays of light reflected and or refracted by other surfaces in the device that are not in contact with the ridge 17 of a finger tip 8. These stray light beams modify the intensity of the actual ridge pattern being read, producing an inaccurate representation of the fingerprint. Light from a source 2 is directed towards a lens system 4 which focuses this beam onto the ridge pattern 17 in contact with the glass or transparent platen 5. The barriers 36 are to be non-reflective to prevent stray beams reflecting off the walls, producing false images. Similarly reflected beams are focused by a Selfoc lens array 6 onto solid state reading elements 7. This is one means of improving the accuracy of the device.

Figure 15:
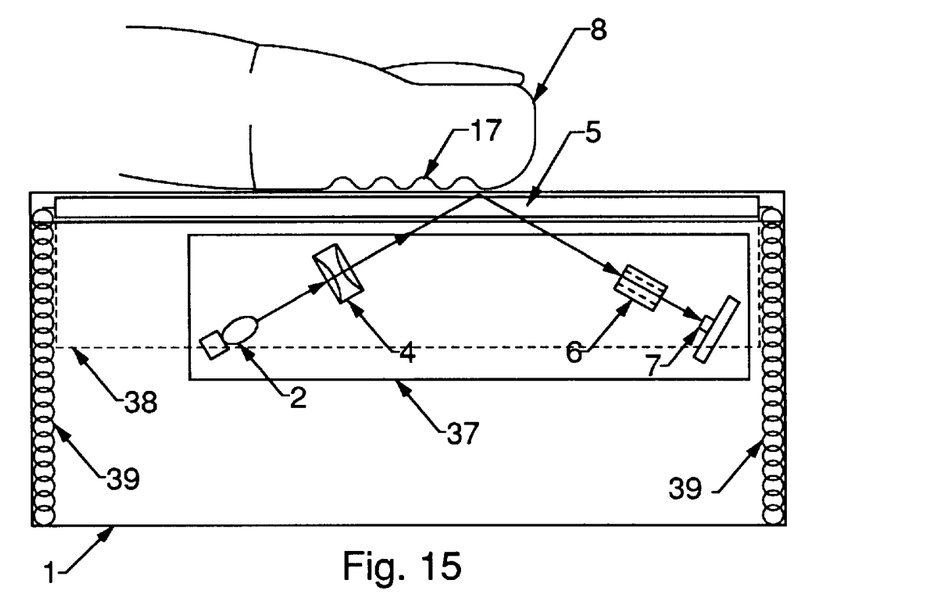
FIG. 15 represents another embodiment of the invention in its starting position in which the platen moves vertically down only by the force of the finger, in accordance with the present invention.
Figure 16:
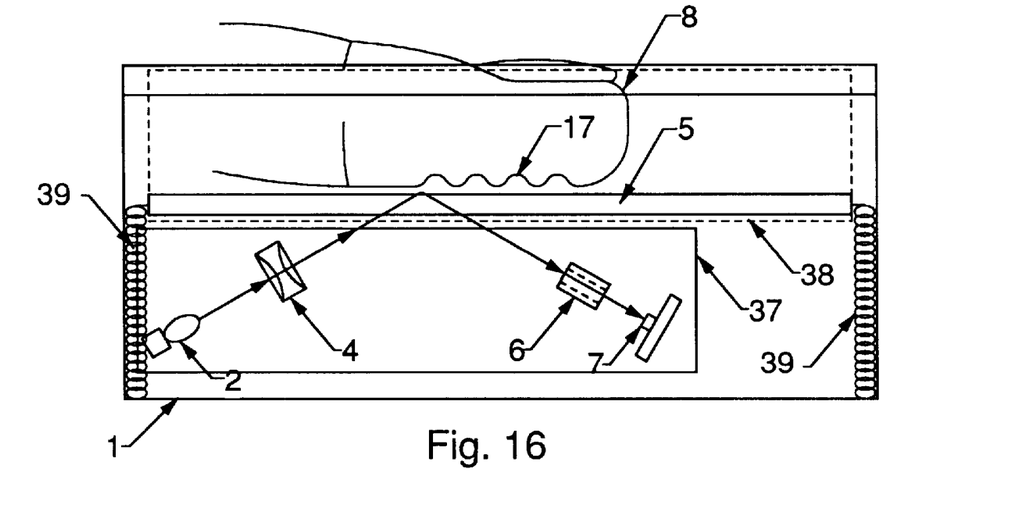
FIG. 16 represents the embodiment of FIG. 15 in its terminating position, in accordance with the present invention.

In a further embodiment of the invention, the apparatus of FIG. 15 is modified from FIG. 1 to produce a fingerprint reading device such that the finger 8 applies a force vertically on the glass or transparent platen 5, which both move downward within the external housing 1. With the platen in its rest or initial position as illustrated in FIG. 15, the illumination source 2, lens system 4, solid state reading elements 7, and Selfoc lens array 6 are all mounted to an internal housing 37, which is positioned and focused at one end of the fingerprint's ridge pattern 17. The external housing contains the glass or transparent platen linked to the internal housing, such that the internal housing moves across the platen by a mechanical means only when the platen is pushed downward or upward, whilst the internal housing and its components are kept at a fixed distance from the platen. As the finger applies a force vertically, the platen moves down in a planar direction within a cavity 38 in the external housing 1, such that the internal housing simultaneously moves across the fingerprint reading multiple ridge orientations until the terminating position of FIG. 16. A mechanical means is employed to traverse the internal housing across the platen, as it simultaneously moves downward equidistant from the platen, by the applied force of the finger only. The linear array of reading elements are individually positioned equidistant from the glass or transparent platen such that their direction of arrangement is perpendicular to the platen's direction of movement. A spring force 39, affixed to the external housing 1 and glass or transparent platen 5, applies a force on the platen to return the platen to its initial position, for any position of the platen, when applied forces are removed from the platen. It is also understood that the following claims are intended to cover all of the general and specific features of the invention herein described, and all statements of the scope of the invention which, as a matter of language, might be said to fall therebetween.

I claim:

1. A method for reading a fingerprint image in which:

a light beam from a light source is directed and aimed through a lateral surface of a transparent platen having a superior surface parallel to an inferior surface;

said light is reflected inside the transparent platen between said parallel surfaces above a critical angle as the light does not leave the transparent platen and a condition of total internal reflection is satisfied;

a finger is pressed against the superior surface of the transparent platen in the area where the ridges of the finger make contact with the superior surface, whereby the light is reflected under the critical angle and the condition of total internal reflection is not satisfied as some light leaves the transparent platen trough the inferior surface;

said light which has left the transparent platen is focused by a focusing element to a light detector which has a solid state array of optical sensors as a reading element.

2. An apparatus for reading a fingerprint image corresponding with the method of claim 1, in which:

the finger is pressed against the superior surface of the transparent platen and is in an initial static position whereby said transparent platen is pushed forward by a static force of friction between the finger and the superior surface of the platen to slide in a linear displacement and in a planar direction to a terminal position of said platen, with the finger remaining stationary with respect to the transparent platen;

the light source, the transparent platen, the focusing element and the reading element are contained in a housing whereby said solid state array of optical sensors are arranged in a linear disposition perpendicular in direction to the transparent platen's linear displacement;

said focusing element and the reading element are placed under the inferior surface of the transparent platen;

said solid state array of optical sensors read multiple lines of the finger as the finger moves towards the terminal position of the transparent platen;

the fingerprint image is constructed from the various intensities of light reflected from the transparent platen for each line of information read.

3. An apparatus for reading a fingerprint image as claimed in claim 1, in which:

a patterned strip of clear and opaque bands is etched or deposited on the superior surface of the transparent platen aligned to the direction of the displacement of the platen and adjacent to tho arca where the finger is applied on said platen;

said patterned strip is illuminated and focused on one end of the array of optical sensors of the reading element whereby as the platen is displaced from the initial position to the terminal position, light and dark patterns on the patterned strip alternately become focused onto said end of the reading element.

* * * * *